(12) United States Patent
Giovanardi et al.

(10) Patent No.: US 12,530,535 B2
(45) Date of Patent: Jan. 20, 2026

(54) INTELLIGENT PREDICTION OF NEXT STEP SENTENCES FROM A COMMUNICATION SESSION

(71) Applicant: Zoom Communications, Inc., San Jose, CA (US)

(72) Inventors: Davide Giovanardi, Saratoga, CA (US); Stephen Muchovej, Bishop, CA (US)

(73) Assignee: Zoom Communications, Inc., San Jose, CA (US)

( * ) Notice: Subject to any disclaimer, the term of this patent is extended or adjusted under 35 U.S.C. 154(b) by 298 days.

(21) Appl. No.: 17/978,074

(22) Filed: Oct. 31, 2022

(65) Prior Publication Data

US 2024/0143936 A1    May 2, 2024

(51) Int. Cl.
*G06F 40/35*     (2020.01)
*G06F 40/284*    (2020.01)

(52) U.S. Cl.
CPC ............ *G06F 40/35* (2020.01); *G06F 40/284* (2020.01)

(58) Field of Classification Search
CPC ................................ G06F 40/35; G06F 40/284
See application file for complete search history.

(56) References Cited

U.S. PATENT DOCUMENTS

| | | | | |
|---|---|---|---|---|
| 9,633,007 | B1 * | 4/2017 | Brun | G06F 16/9024 |
| 11,429,901 | B1 * | 8/2022 | McCourt | G06F 40/216 |
| 11,550,831 | B1 * | 1/2023 | Marks | G06N 20/00 |
| 11,972,424 | B1 * | 4/2024 | Grudetskyi | G06Q 30/0601 |
| 11,983,674 | B2 * | 5/2024 | Hilleli | G06N 20/20 |
| 12,020,265 | B1 * | 6/2024 | Mao | G06Q 30/0243 |
| 12,094,230 | B2 * | 9/2024 | Narlikar | G06F 18/241 |
| 12,118,437 | B2 * | 10/2024 | Stergioudis | G10L 15/063 |

(Continued)

FOREIGN PATENT DOCUMENTS

| | | | | |
|---|---|---|---|---|
| CA | 3217547 | A1 * | 11/2022 | ............ G06F 40/211 |
| CN | 114239588 | A  * | 3/2022 | |

(Continued)

OTHER PUBLICATIONS

International Search Report and Written Opinion mailed on Jan. 22, 2024 in corresponding PCT Application No. PCT/US2023/034727.

*Primary Examiner* — Anne L Thomas-Homescu
(74) *Attorney, Agent, or Firm* — Young Basile Hanlon & MacFarlane, P.C.

(57) ABSTRACT

Methods and systems provide for extracting next step sentences from a communication session. In one embodiment, the system defines a set of annotation guidelines for labeling training data; receives a set of labeled training data including sentences from a transcript of a communication session, a subset of the sentences being associated with a positive label; organizes the labeled training data and trains a model with the labeled training data, the training including, for each of the sentences, inputting the sentence into a language model and a classification head to output a number of class probabilities, and inputting a classification token representing the sentence into a classification head; using a number of classifiers from the trained model to generate ensemble class scores; and using the ensemble class scores to predict one or more next step sentences from the sentences in the transcript.

20 Claims, 9 Drawing Sheets

(56) References Cited

U.S. PATENT DOCUMENTS

| | | | |
|---|---|---|---|
| 2015/0019463 A1* | 1/2015 | Simard | G06F 40/30 |
| | | | 706/12 |
| 2015/0095017 A1* | 4/2015 | Mnih | G06F 40/216 |
| | | | 704/9 |
| 2016/0091965 A1* | 3/2016 | Wang | G06F 3/014 |
| | | | 345/156 |
| 2016/0253309 A1* | 9/2016 | Zhao | G06F 40/211 |
| | | | 704/9 |
| 2018/0268298 A1* | 9/2018 | Johansen | G06V 10/82 |
| 2019/0179903 A1* | 6/2019 | Terry | G06N 3/004 |
| 2019/0180195 A1* | 6/2019 | Terry | G06F 40/295 |
| 2020/0019884 A1* | 1/2020 | McCourt, Jr. | G06N 20/00 |
| 2021/0005183 A1* | 1/2021 | Lee | G10L 15/16 |
| 2021/0240825 A1* | 8/2021 | Kutt | G06F 21/563 |
| 2021/0240826 A1* | 8/2021 | Kutt | G06N 20/00 |
| 2021/0357747 A1* | 11/2021 | Mukherjee | G06V 10/82 |
| 2022/0165257 A1* | 5/2022 | Singh | G10L 15/1822 |
| 2023/0091949 A1* | 3/2023 | Erasmus | G06F 3/017 |
| | | | 715/753 |
| 2023/0111582 A1* | 4/2023 | Jiang | G06F 40/166 |
| | | | 704/9 |
| 2023/0134696 A1* | 5/2023 | Yoshida | G10L 15/08 |
| | | | 704/200 |
| 2023/0140981 A1* | 5/2023 | Pouran Ben Veyseh | |
| | | | G06F 40/40 |
| | | | 704/9 |
| 2023/0144716 A1* | 5/2023 | Loh | G06N 3/045 |
| | | | 705/326 |
| 2023/0214707 A1* | 7/2023 | Sewak | G06F 16/285 |
| | | | 706/12 |
| 2023/0237277 A1* | 7/2023 | Reza | G06F 40/169 |
| | | | 704/9 |
| 2023/0267322 A1* | 8/2023 | Hou | G06F 40/205 |
| | | | 706/15 |
| 2023/0306085 A1* | 9/2023 | Paglieroni | G06N 3/09 |
| 2023/0385649 A1* | 11/2023 | Floratou | G06N 3/0475 |
| 2024/0177071 A1* | 5/2024 | Wang | G06N 20/20 |

FOREIGN PATENT DOCUMENTS

| | | | | |
|---|---|---|---|---|
| CN | 111488473 B | * | 11/2023 | G06F 18/214 |
| WO | WO-2022125911 A1 | * | 6/2022 | G06F 16/2428 |
| WO | WO-2022183138 A2 | * | 6/2022 | G06F 40/30 |
| WO | WO-2022251472 A1 | * | 12/2022 | A61B 5/293 |

* cited by examiner

| 0 | So I can get that quote put together for you, Adam, and I can send it over to you probably within the next. |
|---|---|
| 1 | Let me get you an exact price. |
| 2 | Alright, I'll send you the quote. |
| 3 | I'll send it to you via docusign. |
| 4 | Do you wanna do you want to put on the calendar then for Friday and we can add all the users and everything together? |
| 5 | And I'll send you a bunch of some different training links. |
| 6 | I'll put the quote together, send it over to you |

INTELLIGENT PREDICTION OF NEXT STEP SENTENCES FROM A COMMUNICATION SESSION

FIELD OF INVENTION

The present invention relates generally to digital communication, and more particularly, to systems and methods for providing intelligent prediction of next step sentences from a communication session.

SUMMARY

The appended claims may serve as a summary of this application.

BRIEF DESCRIPTION OF THE DRAWINGS

The present invention relates generally to digital communication, and more particularly, to systems and methods providing for providing intelligent prediction of next step sentences from a communication session.

The present disclosure will become better understood from the detailed description and the drawings, wherein:

FIG. 3 is a diagram illustrating examples of next step sentences.

FIG. 7 is a diagram illustrating one example embodiment of a user interface for presenting a count of next step sentences within a conversation.

DETAILED DESCRIPTION

Figure 1A:
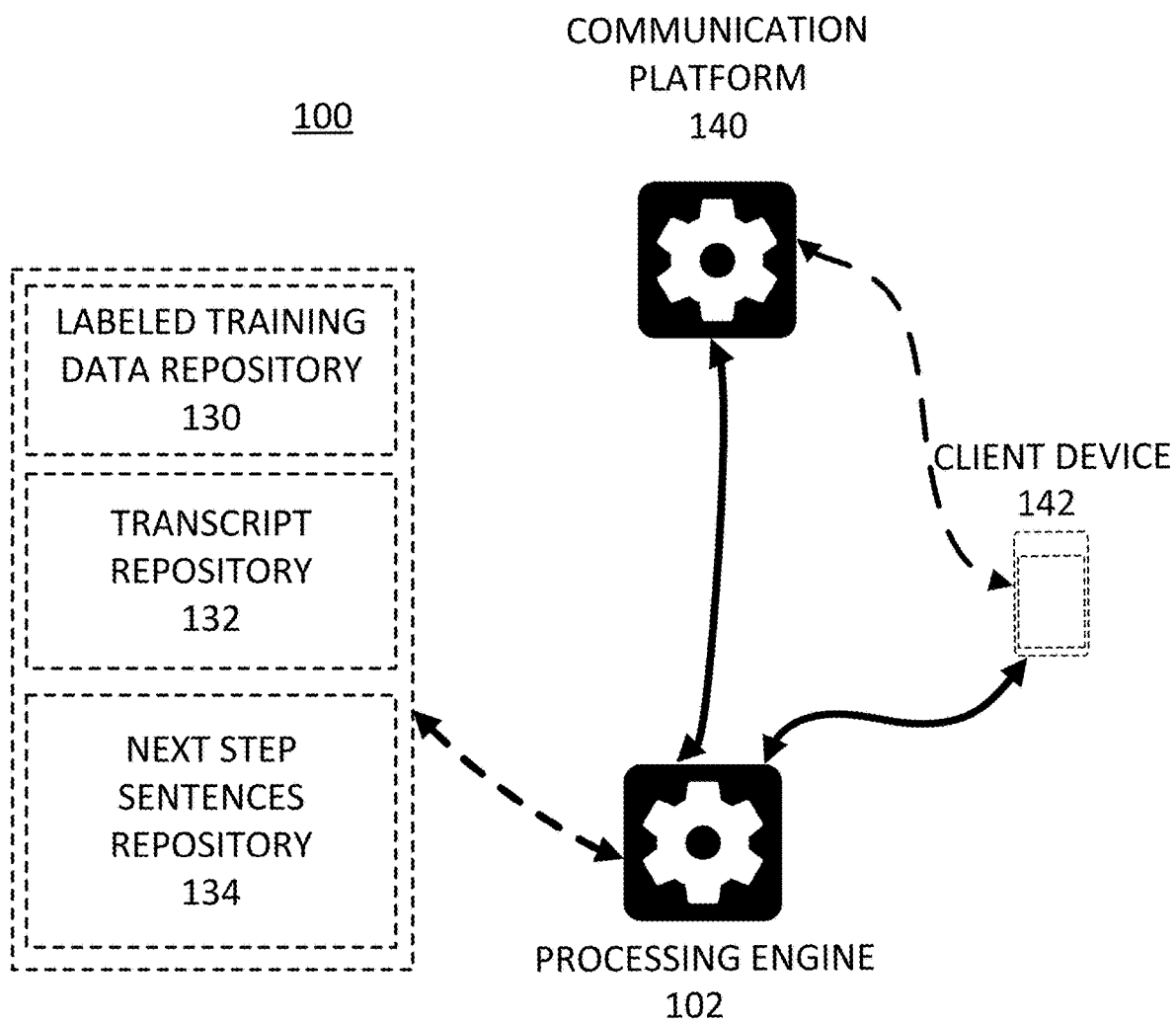
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Digital communication tools and platforms have been essential in providing the ability for people and organizations to communicate and collaborate remotely, e.g., over the internet. In particular, there has been massive adopted use of video communication platforms allowing for remote video sessions between multiple participants. Video communications applications for casual friendly conversation ("chat"), webinars, large group meetings, work meetings or gatherings, asynchronous work or personal conversation, and more have exploded in popularity.

With the ubiquity and pervasiveness of remote communication sessions, a large amount of important work for organizations gets conducted through them in various ways. For example, a large portion or even the entirety of sales meetings, including pitches to prospective clients and customers, may be conducted during remote communication sessions rather than in-person meetings. Sales teams will often dissect and analyze such sales meetings with prospective customers after they are conducted. Because sales meetings may be recorded, it is often common for a sales team to share meeting recordings between team members in order to analyze and discuss how the team can improve their sales presentation skills.

Such techniques are educational and useful, and can lead to drastically improved sales performance results for a sales team. However, such recordings of meetings simply include the content of the meeting, and the communications platforms which host the meetings do not provide the sorts of post-meeting, or potentially in-meeting, intelligence and analytics that such a sales team would find highly relevant and useful to their needs.

One such use case which is currently lacking includes analytics data and metrics around whether team members have discussed "next steps" with a prospective customer. "Next steps" refer to action items the team member indicates will be performed after the meeting, including, e.g., concrete proposals to schedule one or more future meetings, respond to one or more outstanding items or otherwise take one or more actions which will further the progression of the sales relationship in some way or clear barriers toward closing a deal. Knowing whether and how often sales team members utter such phrases as, "I will email the proposal" or "I will get in touch next week to discuss more details" would be useful for measuring and improving the performance and effectiveness of sales meetings and sales team members participating in those meetings.

Thus, there is a need in the field of digital communication tools and platforms to create a new and useful system and method for intelligent prediction of next step sentences from a communication session. The source of the problem, as discovered by the inventors, is a lack of useful meeting intelligence and analytics data provided to members of an organization with respect to remote communication sessions, as well as a lack of trainable models for intelligently predicting whether next step sentences have appeared within communication sessions.

In one embodiment, the system defines a set of annotation guidelines for labeling training data; receives a set of labeled training data including sentences from a transcript of a communication session, a subset of the sentences being associated with a positive label; organizes the labeled training data via sampling; trains a model from the organized and labeled training data, the training including, for each of the sentences, inputting the sentence into a language model and a classification head to output a number of class probabilities, and inputting a classification token representing the sentence into a classification head; using a number of classifiers from the trained model to generate ensemble class scores; and using the ensemble class scores to predict one or more next step sentences from the sentences in the transcript.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 142 is connected to a processing engine 102 and, optionally, a communication platform 140. The processing engine 102 is connected to the communication platform 140, and optionally connected to one or more repositories and/or databases, including, e.g., a labeled training data repository 130, a transcript repository 132, and/or a next step sentences repository 134. One or more of the databases may be combined or split into multiple databases. The user's client device 142 in this environment may be a computer, and the communication platform 140 and processing engine 102 may be applications or software hosted on a computer or multiple computers which are communicatively coupled via remote server or locally.

The exemplary environment 100 is illustrated with only one client device, one processing engine, and one communication platform, though in practice there may be more or fewer additional client devices, processing engines, and/or communication platforms. In some embodiments, the client device(s), processing engine, and/or communication platform may be part of the same computer or device.

Figure 2:
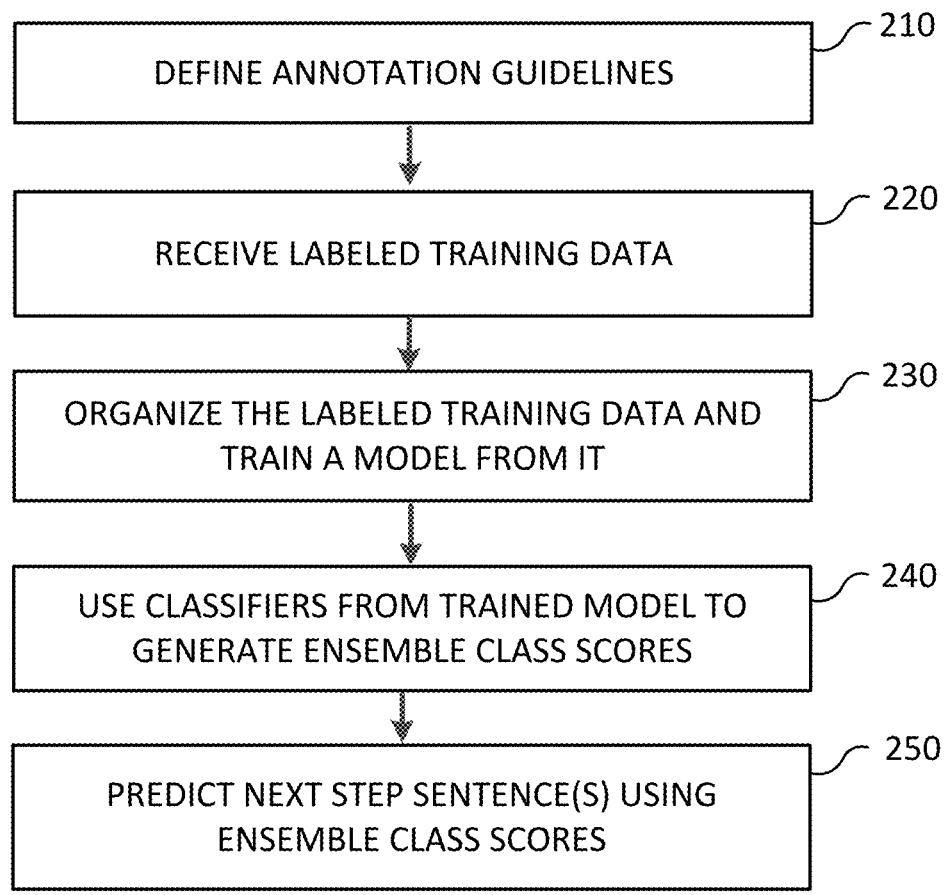
FIG. 2 is a flow chart illustrating an exemplary method that may be performed in some embodiments.

In an embodiment, the processing engine 102 may perform the exemplary method of FIG. 2 or other method herein and, as a result, provide intelligent prediction of next step sentences from a communication session. In some embodiments, this may be accomplished via communication with the client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 142 is a device with a display configured to present information to a user of the device who is a participant of the video communication session. In some embodiments, the client device presents information in the form of a visual UI with multiple selectable UI elements or components. In some embodiments, the client device 142 is configured to send and receive signals and/or information to the processing engine 102 and/or communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 142. In some embodiments, one or more of the communication platform 140, processing engine 102, and client device 142 may be the same device. In some embodiments, the user's client device 142 is associated with a first user account within a communication platform, and one or more additional client device(s) may be associated with additional user account(s) within the communication platform.

In some embodiments, optional repositories can include a labeled training data repository 130, a transcript repository 132, and/or a next step sentences repository 134. The optional repositories function to store and/or maintain, respectively, sets of labeled training data for training models; transcripts containing a number of utterances spoken by participants during communication sessions; and next step sentences which have been predicted to be present for communication sessions. The optional database(s) may also store and/or maintain any other suitable information for the processing engine 102 or communication platform 140 to perform elements of the methods and systems herein. In some embodiments, the optional database(s) can be queried by one or more components of the exemplary environment 100 (e.g., by the processing engine 102), and specific stored data in the database(s) can be retrieved.

Communication platform 140 is a platform configured to facilitate meetings, presentations (e.g., video presentations) and/or any other communication between two or more parties, such as within, e.g., a video conference or virtual classroom. A video communication session within the communication platform 140 may be, e.g., one-to-many (e.g., a participant engaging in video communication with multiple attendees), one-to-one (e.g., two friends remotely communication with one another by video), or many-to-many (e.g., multiple participants video conferencing with each other in a remote group setting).

Figure 1B:
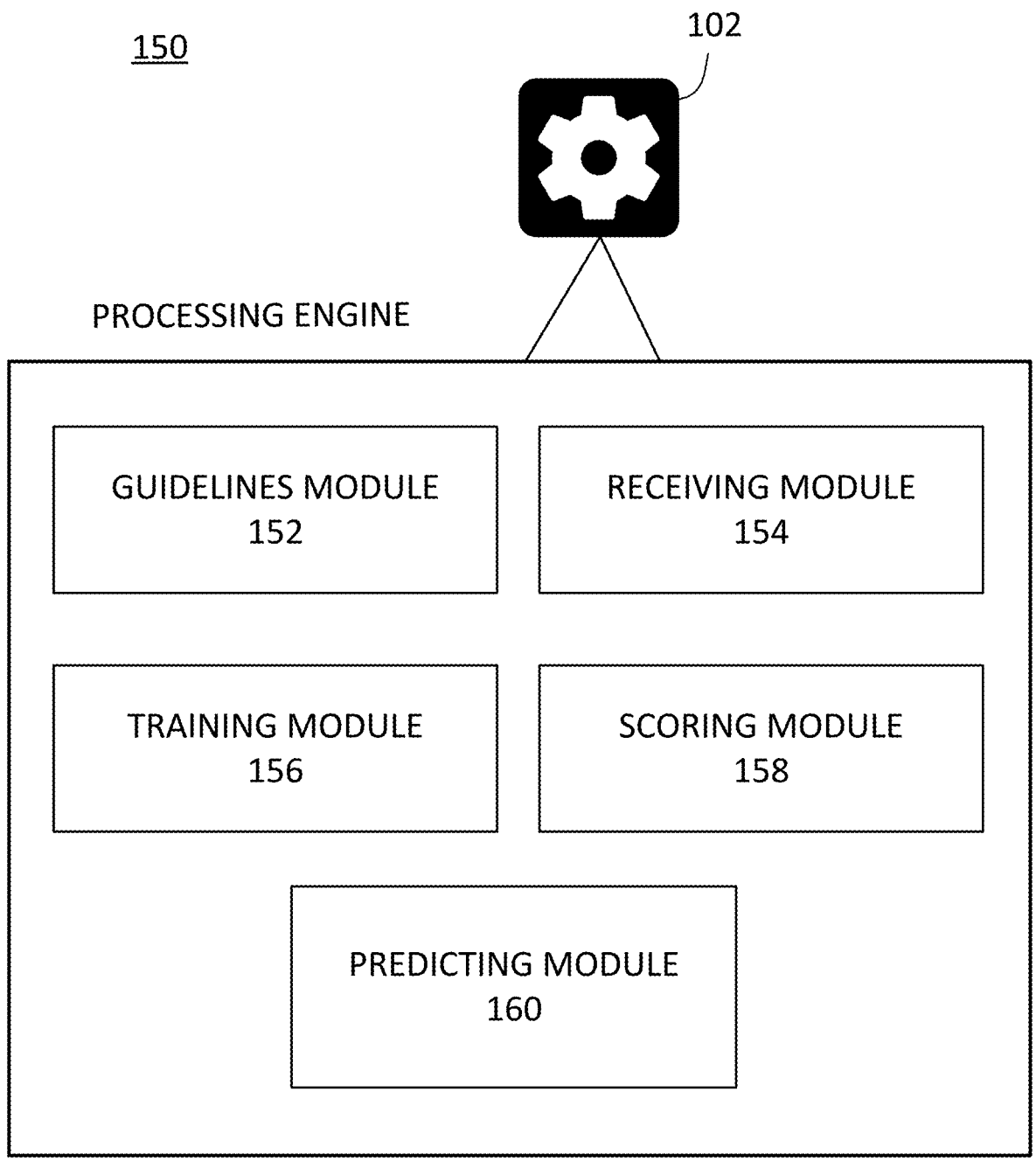
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

Guidelines module 152 functions to define a set of annotation guidelines for labeling training data.

Receiving module 154 functions to receive a set of labeled training data based on the set of annotation guidelines, including a number of sentences from a transcript of a communication session, a subset of the sentences being associated with a positive label. Training module 156 functions to organize the labeled training data via sampling, and train a model from the organized and labeled training data, the training including, for each of the sentences, inputting the sentence into a language model and a classification head to output a number of class probabilities, and inputting a classification token representing the sentence into a classification head.

Scoring module 158 functions to use a number of classifiers from the trained model to generate ensemble class scores.

Predicting module 160 functions to use the ensemble class scores to predict one or more next step sentences from the sentences in the transcript.

The above modules and their functions will be described in further detail in relation to an exemplary method below.

FIG. 2 is a flow chart illustrating an exemplary method that may be performed in some embodiments.

In some embodiments, prior to step 210, the system connects to a communication session (e.g., a remote video session, audio session, chat session, or any other suitable communication session) having a number of participants. In some embodiments, the communication session can be hosted or maintained on a communication platform, which the system maintains a connection to in order to connect to the communication session. In some embodiments, the system displays a UI for each of the participants in the communication session. The UI can include one or more participant windows or participant elements corresponding to video feeds, audio feeds, chat messages, or other aspects of communication from participants to other participants within the communication session.

At step 210, the system defines a set of annotation guidelines for labeling training data. Such annotation guidelines present guidelines or rules by which users interested in annotating or labeling training data ("annotators") may do so in a way that can be understood by the system and used for training a model for next step prediction, as will be described in further detail in the description of step 230 below. In some embodiments, annotators would have viewing access to a transcript including a number of utterances from a communication session. In some embodiments, this transcript represents the training data to be labeled. In some embodiments, annotators may additionally have access to video output data from one or more video streams in the communication session, metadata from the communication session, or other relevant data for annotation. An annotator would label a transcript as training data by deciding whether one or more next step sentences have been spoken as shown in the utterances within the transcript, and if that is the case, then the annotator would annotate the transcript by marking, highlighting, or otherwise designating those sentences with a positive label, indicating that those sentences are next step sentences. The annotation guidelines would contain guidelines for how the annotator is to designate such sentences with a positive label. In this fashion, a labeled training data may be created by human annotation.

In some embodiments, the annotation guidelines specify that an annotator is to annotate sentences with only positive labels to demarcate next step sentences. The annotator does not annotate negative labels for sentences which are not next step sentences. In some embodiments, the system will infer that the sentences which are not labeled as positive are to be designated as negative, i.e., sentences which are not next step sentences.

The annotation guidelines may additionally contain rules or guidelines for what an annotator is to consider as a next step sentence. Some possible rules or guidelines according to various embodiments may be defined as follows. In some embodiments, the next step sentences must each include an owner-action pair structure, i.e., as a sentence structure for the sentence in question. Within this owner-action pair structure, the action is an actionable verb in future tense or present tense, but not past tense. In some embodiments, identifying a next step sentence includes identifying a number of linguistic features within each sentence of the utterance, wherein the linguistic features are used to classify the sentence as a next step sentence or a non-next step sentence. Such linguistic features may include one or more of, e.g.: words or tokens, lemmas, parts of speech (POS), detailed POS tags, dependencies, morphology, word shapes, alpha characters, and/or words in a stop list.

In some embodiments, the owner within the owner-action pair structure is a first-person pronoun, i.e., the owner will be "I" or equivalent. The first-person pronoun may be either singular or plural. In other embodiments, the owner may be a second or third person pronoun, such as, e.g., "John Doe, please send a follow-up email." In a use case where the meeting is a sales meeting, a first-person pronoun is more likely to be applicable, whereas other meetings may vary on usage of first person, second person, and third person pronouns.

In one example, a rule that next step sentences must include usage of the first person will include one or more of part-of-speech (POS) tagging and/or morphology. The rule for the owner being in first person pronoun form may appear as or similar to, for example:

```
first_person_rule = {
  'POS': 'PRON', # pronoun
  'TAG': 'PRP', # personal
  'MORPH': {'IS_SUPERSET': ['Person=1']} # first person singular or plural
}
```

In some embodiments, the one or more sentences are further identified as sentences or parts of utterances which are spoken in a latter portion of the duration of the communication session. That is, the system will identify when a next step sentence is uttered toward the end of the session, which gives a much higher likelihood that the sentence actually refers to next steps to be taken as the meeting concludes.

In some embodiments, examples of actionable verbs may be, e.g.: "send", "talk", "check", "email", "shoot", "reach out", "touch base", "schedule", and any other actionable verb which may suggest discussion of next steps. In some embodiments, determining that the action is an actionable verb includes identifying the actionable verb within the sentence based on a list of predetermined actionable verbs. In some embodiments, the list of predetermined actionable verbs is selected based on one or more industries associated with the prespecified organization a subset of the participants belong to.

In some embodiments, the linguistic features may be such that the actionable verb will not be a stative verb nor a sense verb, e.g., next step actionable verbs will not include "be", "notice", "see", "look", "smell", "hear", "appear", "seem", "sound", "like", "want", or similar.

In some embodiments, for example, the rules for actionable verbs may appear as or similar to:

```
action_verb_rule = {
  'POS': 'VERB',
  'LEMMA': {"IN": self.action_verbs}
}
```

In some embodiments, the system defines the specific constructs that characterize next step sentences by defining a number of rules to form a general pattern for next steps discussion within sentences. For example, the sentence "I'm going to send you an email later today" qualifies as a next step sentence, and a rule allows for "going to" to be substituted with "gonna" in similar sentence patterns, as well as "we're" being substituted for "I'm". In some embodiments, POS tagging, morphology, and lemmatization are employed to make such rules and patterns as general as possible.

In some embodiments, in addition to the POS-tagging patterns above, one or more custom rules may be used which may fall outside of the generalized rules for patterns. Such custom rules may be very narrowly applied and specific to next step sentences. For example, one custom rule may be that explicit mentions of terms as "next steps" or "action items" are classified as next step sentences. In another example, verb phrases such as "circle back", "look into", and "get back" are also classified as next step sentences.

In some embodiments, the system receives a transcript of a conversation between the participants produced during the communication session. That is, the conversation which was produced during the communication is used to generate a transcript, which is received by the system. In some embodiments, the transcript is textual in nature. In some embodiments, the transcript includes a number of utterances, which are composed of one or more sentences attached to a specific speaker of that sentence (i.e., participant). Timestamps may be attached to each utterance and/or each sentence. In some embodiments, the transcript is generated in real-time while the communication session is underway, and is presented after the meeting has terminated. In other embodiments, the transcript in generated in real-time during the session and also presented in real-time during the session.

In some embodiments, upon receiving the transcript, the system extracts utterances spoken by the participants from the transcripts. Utterances are recognized by the system as one or more sentences attached to a specific speaker of that sentence (i.e., participant). Timestamps, as well as a speaker who uttered the utterance, may be attached to each utterance and/or each sentence. In some embodiments, the transcript itself provides clear demarcation of utterances based on the timestamps which are placed at the start of each utterance. Thus, extracting these utterances may involve extracting the separate utterances which have been demarcated by the timestamps in the transcript.

In some embodiments, the system identifies a subset of the utterances spoken by a subset of the participants associated with a prespecified organization. In some embodiments, the prespecified organization may be a business entity or company, department, team, organization, or any other suitable organization. In some embodiments, team members may identify themselves and/or one another as members, employees, contractors, or otherwise associated with the organization. In some embodiments, hierarchical relationships between users associated with the organization can be formed due to users explicitly providing such information, via the system implicitly drawing connections based on additional information, or some combination thereof. In some embodiments, a reporting chain of command can be established based on such implicit or explicit hierarchical relationships. In some embodiments, the system identifies that the participant is part of the organization upon the participant logging into the communication platform. In some embodiments, if the domain of the email address associated with the participant is the same email domain as a known member of an organization, they may be presumed to be associated with the organization as well. In some embodiments, within the context of a sales meeting involving sales representatives and prospective customers, the system can use organizational data to determine which participants are sales representatives and which participants are customers. In such a context, the set of analytics data presented in later steps relates to one or more performance metrics for the sales team.

At step 220, the system receives a set of labeled training data based on the set of annotation guidelines, including a number of sentences from a transcript of a communication session, a subset of the sentences being associated with a positive label. In some embodiments, the system only accepts labeled training data which follows the annotation guidelines or at least a subset of the annotation guidelines which are required and not optional. In some embodiments, the system may receive the set of labeled training data from a repository of labeled training data. In some embodiments, the set of labeled training data can include labeled training data from a number of communication sessions which have occurred in the past.

At step 230, the system organizes the labeled training data via sampling and trains a model from the organized and labeled training data, the training including, for each of the sentences: (1) inputting the sentence into a language model and a classification head to output a number of class probabilities, and (2) inputting a classification token representing the sentence into a classification head. In various embodiments, the model to be trained may be, for example, a machine learning ("ML") model, a machine vision ("MV") or computer vision model, a natural language processing ("NLP") model, any other suitable AI model, or any combination thereof.

In some embodiments, the system additionally trains the model from negative labels which are inferred from the positive labels associated with the subset of sentences. In this case, the model is also trained to sample balanced sentences from the negative labels.

The model is trained by the system by organizing the labeled training data via sampling, which is done to analyze a subset of the dataset in order to ascertain the relevant information in the larger dataset. For example, if a dataset contains 100 sentences, then the system may specify 5 "folds", with each of the 5 folds containing 20 sentences which are mutually exclusive and non-overlapping. The 5 folds thus represent a split of the dataset of 100 sentences. The system may then be able to analyze one of the folds and multiply the results by 5 to ascertain an accurate representation of the full dataset.

In some embodiments, the system trains the model using cross-validation. Cross-validation is a statistical method used to estimate the skill of machine learning models. It is commonly used to compare and select an ML model for a given predictive modeling problem. Cross-validation may be used to, e.g., overcome overfitting problems with ML models. It is a resampling method that uses different portions of data to test and train a model on different iterations. It may be used with predictive goals for estimating how accurately a predictive model will perform in practice.

In some embodiments, k-fold cross-validation is used to train the model. The "k" in k-fold refers to the number of groups that a given dataset is to be split into, in order to make use of a limited sample for estimating how the model is expected to perform in predictions on data not used during the training of the model. For example, a 5-fold cross-validation (i.e., where k=5) may be performed such that 4 out of the 5 folds are used for training the model, and 1 out of the 5 folds are used for testing the model. Testing may be performed to evaluate the score of the model as it is being trained so that the score will continue to improve. Once the model begins overfitting data points, the model does not improve anymore, which is a sign the system can use to stop training at that point.

In some embodiments, the procedure for k-fold cross-validation may include: (1) shuffling the dataset randomly, (2) splitting the dataset into k groups, (3) for each unique group: take the group as a hold out or test data set, take the remaining groups as a training data set, fit a model on the training set and evaluate it on the test set, retain the evaluation score and discard the model; and (4) summarize the skill of the model using the sample of model evaluation scores.

In some embodiments, the system trains the model using stratified k-fold cross-validation. Folds may contain, e.g., mostly negative sentences (i.e., sentences which have been inferred to have negative labels by the system), no positive sentences representing next steps, or all positive sentences representing next steps, none of which are desirable states for training. For example, if the data distribution starts with 20% positive labels and 80% negative labels, then with regular cross-validation, a class imbalance results where one fold may have 95% of positive labels and 5% of negative labels, and another fold has a drastically different distribution. Thus, in order to achieve more balanced training of the model, stratified k-fold cross-validation is performed, such that every fold has a balance of positive sentences (representing next step sentences) and negative sentences. In this way, class balance can be maintained.

The system trains the model by first, for each of the sentences, inputting the sentence into a language model and a classification head to output a number of class probabilities. In some embodiments, there are two class probabilities, positive and negative. In this case, for each sentence, a vector of two dimensions is present for the two probabilities and the sample. The positive class has a certain probability output, while the negative class has another probability output. For example, if the positive class has a probability output of 20%, then the negative class will have a probability output of 80%. In some embodiments, the class probabilities include one class probability output per sentence.

In some embodiments, the language model used may be based on transformer-based ML techniques for natural language processing ("NLP") pre-training, such as, e.g., Bidirectional Encode Representations from Transformers ("BERT"). One such example of a language model is RoBERTa. For each sentence, the system feeds the sentence into the language model, which results in a series of hidden states. In some embodiments, the language model is pre-trained via a masked language model ("MLM"). The language model may output, in one example, 12 hidden states and 12 attention heads.

The system then trains the model by inputting a classification token representing the sentence into a classification head. In some embodiments, only a classification token which was appended to the input is considered. The classification token represents a classification of the sentence. The classification head will average all the hidden states of the language model. In some embodiments, for a given sentence, before feeding the sentence into the language model, pre-processing is performed to map each word of the sentence to a number, which is a token the model is able to recognize. This classification token is then inputted into a classification head in order to fine-tune the model. In some embodiments, the classification head may be composed of multiple layers, which may be linear or non-linear. For example, the classification head may be composed of a linear layer, a tan h layer, and another linear layer. In some embodiments, a softmax layer may be included.

In some embodiments, the system computes a loss using the classification token input into the classification head. In some embodiments, the loss computed is a cross-entropy loss. In some embodiments, the model learns to predict outcomes by a backpropagation algorithm, where what is being backpropagated is the loss amount. "Loss" may be defined as how much the model deviates from the actual label. Cross-entropy loss measures the performance of a classification model whose output is a probability value between 0 and 1, and may be represented as an equation with the output of an integer, where the integer is higher when the deviation is higher. The cross-entropy loss is 0 if the model has an ideal output, i.e., 100% positive label, 0% negative label. This can be used by the system to ascertain how much the model has made a mistake. In some embodiments, weights of the model may be modified based on the cross-entropy loss so that on the next iteration, the model makes less mistakes.

At step 240, the system uses a number of classifiers from the trained model to generate a number of ensemble class scores. For example, in 3-fold cross-validation, 3 classifiers are used by the system, with each fold being used to train a different classifier. First, the dataset is split into 3 folds. The 3 classifiers represent 3 different models, because the folds on which they train will be different. 3 scores will therefore result rather than one. An "ensemble" is composed of these classifiers. For predicting a single sentence, each model will output 3 class probabilities. For example, 55/45, 35/65, and 25/75 may be outputted as class probabilities. An ensemble class score is generated by aggregating these class probabilities. In some embodiments, aggregation can be performed by, e.g., summing up all the scores of the class, then dividing by the number of classifiers to calculate a class probability mean. In this example, 55+35+25 divided by 3 is one ensemble class score, while 45+65+75 divided by 3 is another.

At step 250, the system uses the ensemble class scores to predict one or more next step sentences from the sentences in the transcript. In some embodiments, once the ensemble class scores are computed, the system may perform "max pooling" whereby the higher number of the ensemble class scores is determined to be the predicted class. If the positive class is higher, then a next step sentence is predicted. If the negative class is higher, then a next step sentence is not predicted. Each sentence may be predicted to either be a next step sentence or not a next step sentence based on this process.

In some embodiments, predicting the next step sentences includes applying a threshold for positive class predictions in order to control for false positive predictions. For example, if there are two classes, then the probability sums to 1. If there are ensemble class scores representing 51% and 49%, with a threshold of 50%, then false positives may easily result. However, to implement a stricter threshold of 55%, then for positive predictions, the score must be 55% or greater in order for a prediction of a next step sentence to occur. This can be used to reduce false positives, i.e., predictions of next step sentences for sentences which are actually not next step sentences.

In some embodiments, the system performs retraining of the model based on user feedback, such as additional labeled training data. In some embodiments, the user can be enabled to identify and label data after predictions are made. For example, the user may be able to select, from a transcript, next steps that were missed by the predictive model, or flag next step sentences which were incorrectly identified. This feedback can then be used to further refine and improve the model. In some embodiments, an automated evaluation script is employed. In some embodiments, the same k-fold split is employed, along with the same cross-validation training being performed, to output a new test set score. The model is updated if the test set score is an improvement.

In some embodiments, the system determines a set of analytics data corresponding to the next step sentences and the participants associated with speaking them. In some embodiments, the determination is performed by one or more AI models, as described above. Analytics data may include a wide variety of data related to next step sentences. For example, the analytics data may include one or more pieces of data comparing usage of next step sentences by one participant to usage by another participant, or usage by one sales team to another sales team, etc. In some embodiments, aggregate data may be determined for usage of next step sentences across multiple conversations. In some embodiments, next step sentences data may be broken down by topic segment, where topic segments amount to different chapters within the session and may be determined, user-submitted, or a combination thereof.

In some embodiments, the system presents, to one or more users of the communication platform associated with the organization, at least a subset of the analytics data corresponding to the next step sentences.

In some embodiments, the analytics data is presented at one or more client devices associated with the one or more users. The client device(s) may be configured to display a UI related to the communication platform and/or communication session. In various embodiments, the one or more client devices may be, e.g., one or more desktop computers, smartphones, laptops, tablets, headsets or other wearable devices configured for virtual reality (VR), augmented reality (AR), or mixed reality, or any other suitable client device for displaying such a UI.

In various embodiments, the users presented with the analytics data may be one or more of: one or more participants of the communication session associated with the organization, one or more administrators or hosts of the communication session, one or more users within an organizational reporting chain of participants of the communication session, and/or one or more authorized users within the organization. In some embodiments, users may be authorized for their client devices to receive a UI presenting data on extracted next step sentences if they are granted permission to access, view, and/or modify such data. In some embodiments, a UI for permissions control may be presented to one or more hosts, administrators, or authorized individuals which allows them to customize a number of settings for providing permissions to users with respect to such data. For example, a user authorized to manage permissions controls for a communication session, or all communication sessions for a particular organization, may be able to add participants, remove participants, add, remove, or modify the particular data or types of data which will be presented for such a session, and more.

Within this displayed UI presented to the one or more client devices, data corresponding to the extracted next step sentences can be displayed. For example, a UI may be shown which displays aggregate analytics data pertaining to a sales team's meetings with clients over multiple conversations and communication sessions. Within this aggregate analytics data, average next step sentences across conversations can be displayed with respect to the entire team's performance. In some embodiments, data on average next step sentences used during conversations is additionally or alternatively displayed for each individual member of a group. An example of such a UI displayed to client device(s) is illustrated in FIG. 3 and described in further detail below. In some embodiments, rather than aggregate analytics data or data shown for all team members, individual and/or customized analytics data for a particular participant can be viewed, including potentially a wide variety of data for that particular individual.

Figure 5:
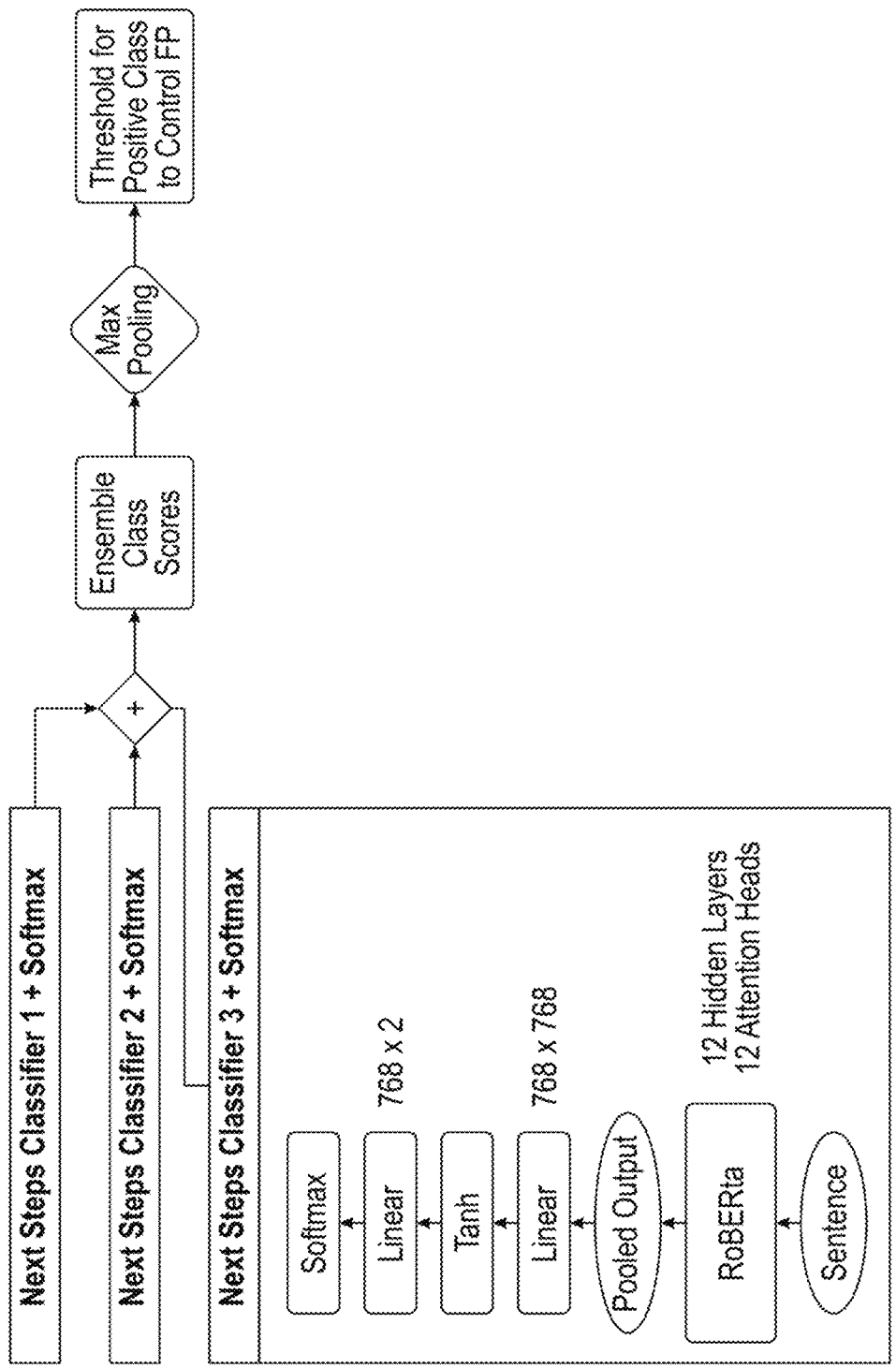
FIG. 5 is a diagram illustrating one exemplary method for intelligent prediction of next step sentences from a communication session.

In some embodiments, the displayed UI may additionally or alternatively present one or more windows which present data with respect to an individual recording, such as the most recent conversation or a currently-in-progress conversation produced in a single given communication session. Users may be able to access a playback recording of the communication session, as well as see various pieces of data with respect to the communication session. In some embodiments, users may be able to view a transcript related to the conversation produced, and instruct the UI to display the detected next step sentences used within the transcript in a highlighted or similar fashion. In some embodiments, a UI element with a playback recording may present one or more pieces of aggregate analytics data or individual analytics data corresponding to the communication session as a whole, the particular topic segment the user is playing back, or any other suitable data which can be presented. An example of such a UI element is illustrated in FIG. 5, described in further detail below.

In some embodiments, the analytics data can be provided for a summary or post-meeting notes to one or more users. For example, data relating to next step analytics can be sent by email in a summary automatically after a meeting, or a follow-up email to one or more participants can be automatically generated for a participant or agent to send. Post-meeting notes for participants' own personal use may also be automatically generated containing analytics data for next step sentences.

FIG. 3 is a diagram illustrating examples of next step sentences.

The illustration shows a chart with 7 examples (0-6) of next step sentences which were detected within an example of a transcript produced for a communication session. Each of the examples shows the full sentence which was detected as a next step sentence. For example, the first detected next step sentence in row 0 reads, "So I can get that quote together for you, Adam, and I can send it over to you probably within the next [day]." In this sentence, both the formulations "I can get that quote" and "I can send it over to you" are detected as next step sentences. In the former, "I" is the first-person pronoun owner, and "get" would be detected as the action verb, with "can get" being detected as future tense. Likewise for the latter, "I" would be the first person pronoun owner in the owner-action pair structure, "send" is the action verb, and "can send" indicates a future tense.

Figure 4:
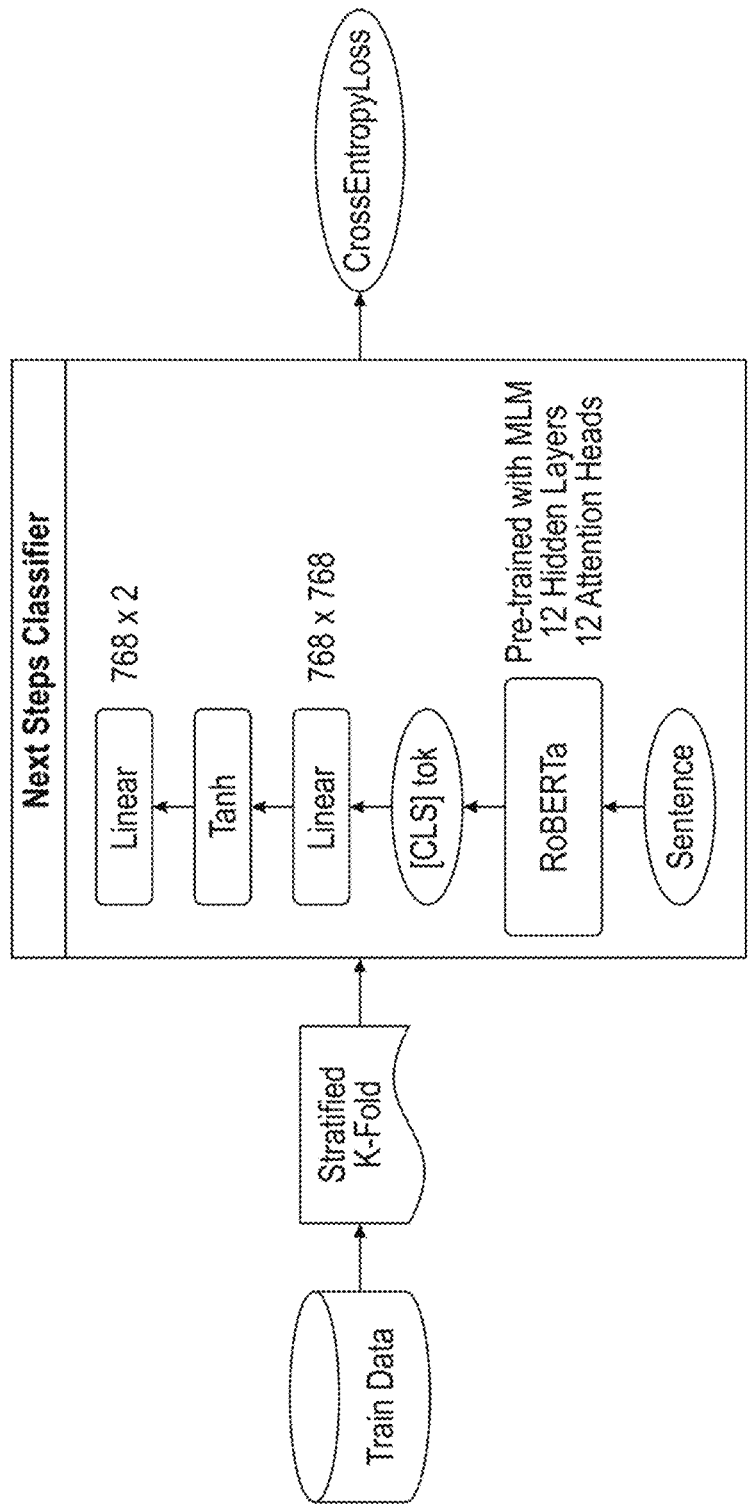
FIG. 4 is a diagram illustrating one exemplary method for intelligent prediction of next step sentences from a communication session.

FIG. 4 is a diagram illustrating one exemplary method for intelligent prediction of next step sentences from a communication session. As described above with respect to FIG. 2, labeled training data is first received, then stratified k-fold cross-validation is performed to train a model. A next steps classifier is then employed. Each sentence is fed into a language model ("RoBERTa", in this example). A classification token is then inputted into a classification head consisting of a linear layer, a tan h layer, and a linear layer. Cross-entropy loss is computed as a result.

FIG. 5 is a diagram illustrating one exemplary method for intelligent prediction of next step sentences from a communication session. As described above with respect to FIG. 2 and FIG. 4, three next steps classifiers are employed, each including a softmax layer. The class probability outputs of each next step classifier are summed together to obtain two ensemble class scores, one for each class (e.g., positive and negative). Max pooling is then performed to determine the higher ensemble class score of the two, which is determined to predict whether the sentence in question is a next step sentence or not. As a last step, the system determines whether the higher ensemble class score meets or exceeds a threshold to control for false positives. If the higher ensemble class score is the positive score, and the positive ensemble class score meets or exceeds the threshold, then the model predicts this particular sentence as being a next step sentence.

Figure 6:
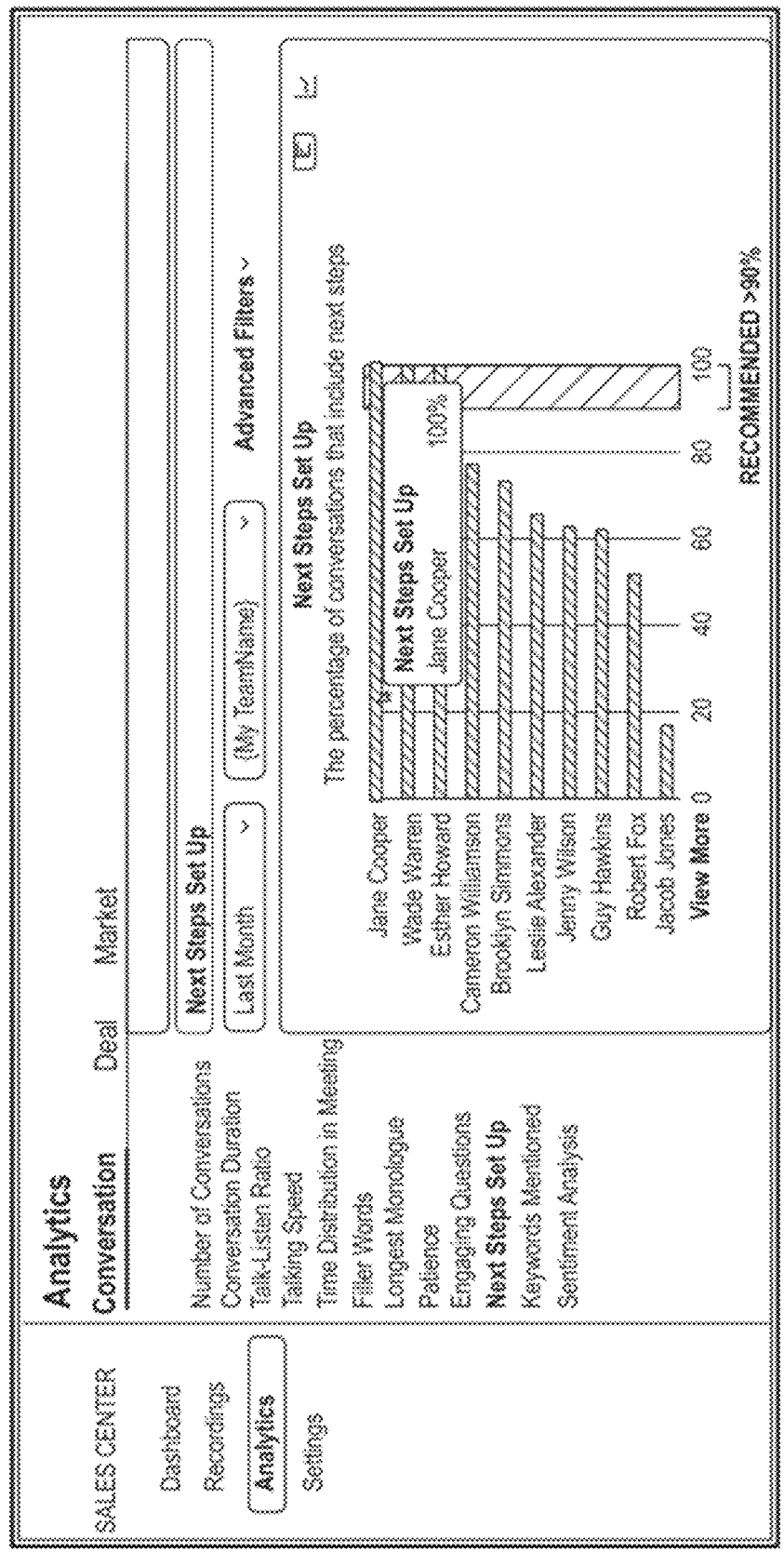
FIG. 6 is a diagram illustrating one example embodiment of a user interface for presenting analytics for next step sentences.

FIG. 6 is a diagram illustrating one example embodiment of a user interface for presenting analytics for next step sentences.

Within the illustrated UI, an analytics tab is presented at a display of a client device. A "Conversation" sub-tab is displayed with a number of analytics and metrics related to an aggregate of multiple conversations which participants have participated in within communication sessions for a sales team. One of the analytics elements which can be further navigated to is labeled "Next Steps Set Up", which is currently selected for display within the UI window. This set of analytics data refers to the percentage of conversations that include identified next steps language.

In the example, Jane Cooper, Wade Warren, and Esther Howard have uttered next steps sentences in 100% of the conversations. On the lower end, Jacob Jones has included next steps sentences in less than 20% of the conversations. A "recommended" number below this data shows that a recommended ideal percentage for conversations which include next steps language is over 90%. Thus, within this particular sales team, three participants have met the ideal or target suggested by the analytics tab for the next steps data, while the remaining seven participants have not.

Additionally, filters appear above the data which allow for filtering conversations based on time and team. In this example, conversations from last month are included in the time filter, while the participant's team name is used for the team for which analytics data is displayed. Additional advanced filters may be applied via a drop down box UI element, if desired.

Figure 7:
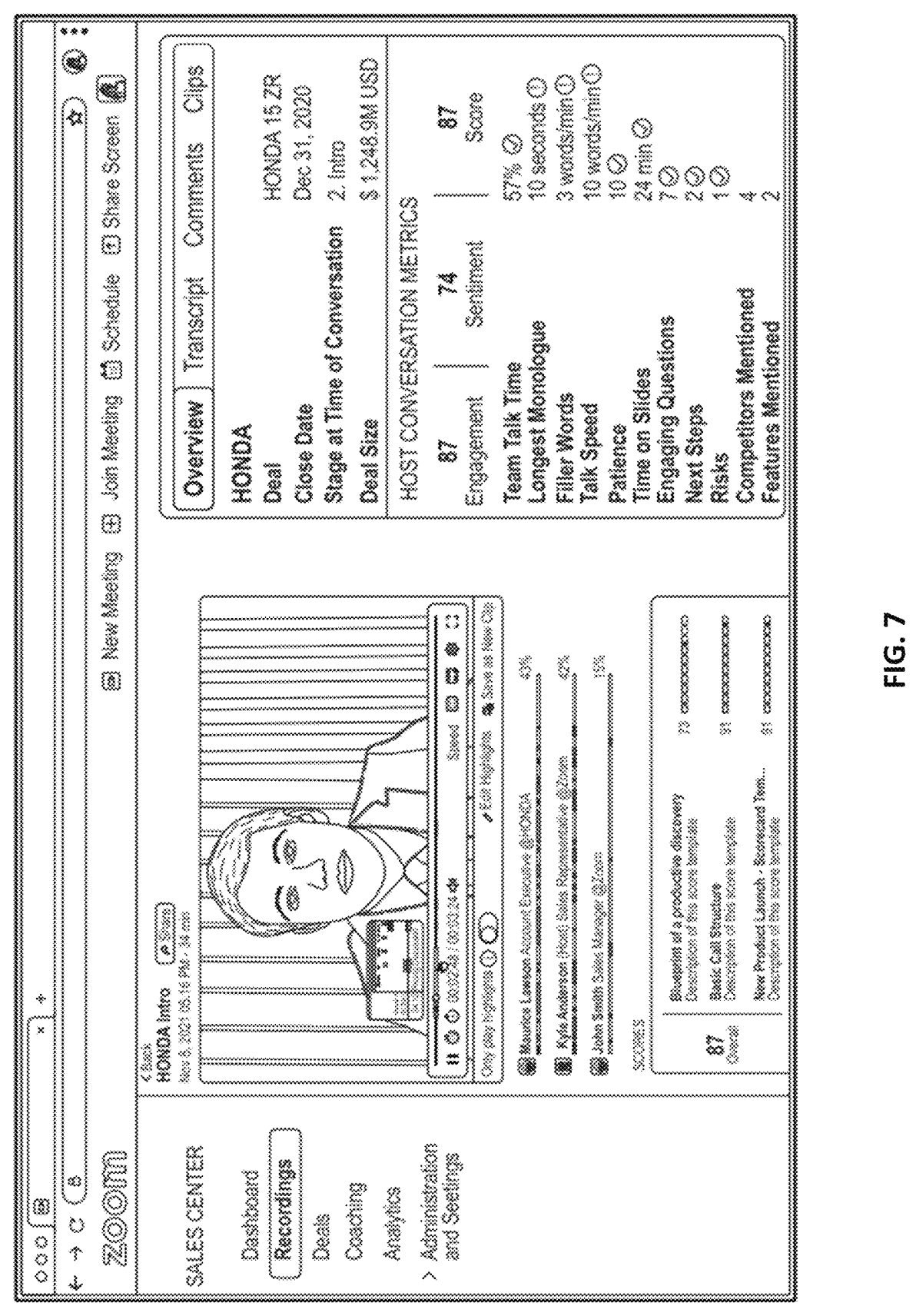

FIG. 7 is a diagram illustrating one example embodiment of a user interface for presenting a count of next step sentences within a conversation.

Within the illustrated UI, a "Recordings" tab is presented at a display of a client device. Information about a specific recording of a communication session is displayed, including a video of the recording itself which can be played back in various ways or adjusted to skip to different times or topics within the video. A timeline allows the user to skip to different topic, and when the user hovers over a topic, a timestamp as well as a topic segment name is displayed.

On the right side of the window, a number of aggregate analytics data and/or metrics for the entire sales team are displayed with respect to the one, specific recording and communication session, including a "Next Steps" metric for the entire team. The Next Steps metric shows the data for the entire team in terms of the number of next step sentences used throughout the conversation, which in this example is 2 next step sentences. Next to this data, an icon with a checkmark is displayed, indicating that this number of next step sentences used falls within a recommended number (e.g., a recommended range) of next step sentences to be used in the conversation. In some embodiments, the recommended number is predetermined and fixed, while in other embodiments, the recommended number may be based on one or more recommendation criteria, such as the past performance of the team, recommended performances for the industry, an aggregate recommended performance for the combination of participants involved based on individual participant recommended performances, or any other such suitable criteria for generating a recommended number for the metric.

Directly below the video playback UI element, a list of participants is shown for a particular topic segment, with data relating to each. The information presented for each participant, as well as the order of participants, may change based on the topic segment currently being played or currently skipped to. In some embodiments, a user may be able to click on his own name from this list, or potentially other participants, to receive individualized and/or customized analytics data pertaining to him or her in particular. For example, the next step sentences uttered by just that participant may be displayed, or both the individual data for that participant as well as the aggregate data so that the participant can compare their own performance with respect to the total sales team involved in the conversation (e.g., a visual comparison).

In some embodiments, this UI for the recording may additionally or alternatively show such metrics, including the "Next Steps" individual or aggregate data, for a particular topic within the conversation, depending on where in the video recording the participant has skipped to or is currently playing back. For example, if the user skips to timestamp 04:12 in the recording, which is labeled with topic segment "Pricing Discussion", then the UI may additionally or alternatively show the number of next step sentences used that is calculated for that topic segment alone. In this way, users, e.g., sales teams and their individual sales representatives, can view analytics data on their performance for each individual topic, not just as a whole for the recording or across multiple conversations. This can be useful, for example, if a sales representative learns via the data that they use next step sentences relatively rarely during a concluding farewell segment of the discussion, which may introduce a negative effect on customer sentiment as they conclude the discussion or immediately after. The participant may then be able to correct this to increase the amount of next step sentences used during the concluding portions of discussions, thus improving his or her sales performance and leading to better sales results.

Figure 8:
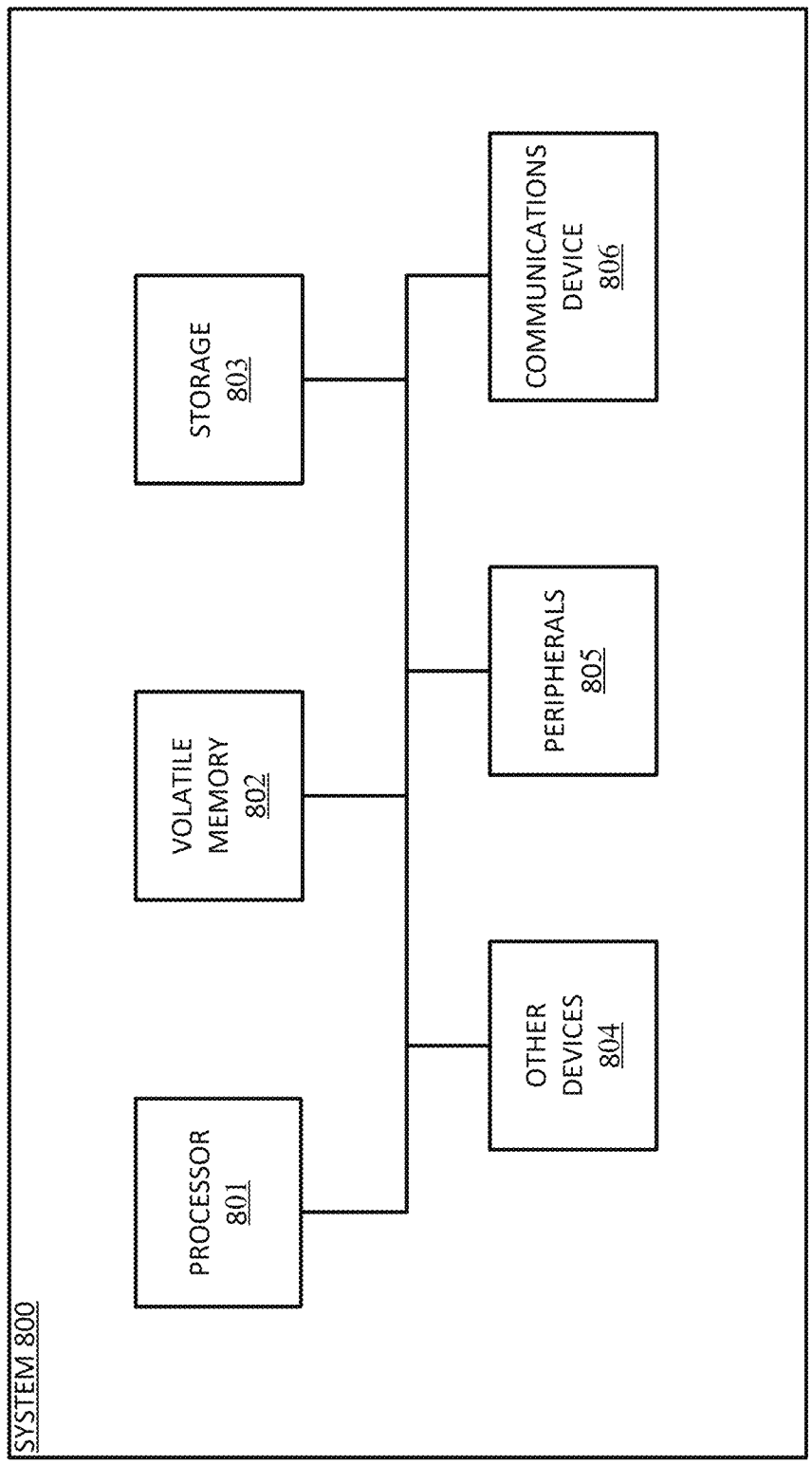
FIG. 8 is a diagram illustrating an exemplary computer that may perform processing in some embodiments.

FIG. 8 is a diagram illustrating an exemplary computer that may perform processing in some embodiments. Exemplary computer 800 may perform operations consistent with some embodiments. The architecture of computer 800 is exemplary. Computers can be implemented in a variety of other ways. A wide variety of computers can be used in accordance with the embodiments herein.

Processor 801 may perform computing functions such as running computer programs. The volatile memory 802 may provide temporary storage of data for the processor 801. RAM is one kind of volatile memory. Volatile memory typically requires power to maintain its stored information. Storage 803 provides computer storage for data, instructions, and/or arbitrary information. Non-volatile memory, which can preserve data even when not powered and including disks and flash memory, is an example of storage. Storage 803 may be organized as a file system, database, or in other ways. Data, instructions, and information may be loaded from storage 803 into volatile memory 802 for processing by the processor 801.

The computer 800 may include peripherals 805. Peripherals 805 may include input peripherals such as a keyboard, mouse, trackball, video camera, microphone, and other input devices. Peripherals 805 may also include output devices such as a display. Peripherals 805 may include removable media devices such as CD-R and DVD-R recorders/players. Communications device 806 may connect the computer 800 to an external medium. For example, communications device 806 may take the form of a network adapter that provides communications to a network. A computer 800 may also include a variety of other devices 804. The various components of the computer 800 may be connected by a connection medium such as a bus, crossbar, or network.

It will be appreciated that the present disclosure may include any one and up to all of the following examples.

Example 1. A method, comprising: defining a set of annotation guidelines for labeling training data; receiving a set of labeled training data based on the set of annotation guidelines, comprising a plurality of sentences from a transcript of a communication session, a subset of the sentences being associated with a positive label; organizing the labeled training data via sampling; training a model from the organized and labeled training data, the training comprising, for each of the sentences: inputting the sentence into a language model and a classification head to output a plurality of class probabilities, and inputting a classification token representing the sentence into a classification head; using a plurality of classifiers from the trained model to generate a plurality of ensemble class scores; and using the ensemble class scores to predict one or more next step sentences from the plurality of sentences from the transcript.

Example 2. The method of example 1, wherein the sampling performed to organize the labeled training data is random stratified sampling.

Example 3. The method of any of examples 1-2, further comprising: connecting to a communication session involving one or more participants, the detection of the one or more next step sentences being performed in real time during the communication session.

Example 4. The method of any of examples 1-3, further comprising: receiving the transcript of a conversation between the participants produced during the communication session; and extracting, from the transcript, the plurality of sentences comprising a plurality of utterances spoken by participants during the communication session.

Example 5. The method of any of examples 1-4, further comprising: receiving video output frames for the communication session, the video output frames being used to detect one or more next step sentences from the plurality of sentences from the transcript.

Example 6. The method of any of examples 1-5, wherein the plurality of class probabilities comprises one class probability output per sentence.

Example 7. The method of any of examples 1-6, further comprising: computing a cross-entropy loss using the classification token input into the classification head.

Example 8. The method of any of examples 1-7, wherein the predicted next step sentences each comprise an owner-action pair structure where the action is an actionable verb in future tense or present tense.

Example 9. The method of any of examples 1-8, further comprising: inferring, from the positive labels associated with the subset of sentences, negative labels to be associated with the remaining sentences outside of the subset of sentences, the model being additionally trained to sample balanced sentences from the negative labels.

Example 10. The method of any of examples 1-9, wherein the model is trained via cross-validation.

Example 11. The method of example 10, wherein the model is trained via k-fold cross-validation incorporating a plurality of folds.

Example 12. The method of example 11, wherein the k-fold cross-validation is stratified.

Example 13. The method of any of examples 1-12, wherein the plurality of classifiers are aggregated to generate the plurality of ensemble class scores.

Example 14. The method of any of examples 1-13, wherein predicting the one or more next step sentences is performed by calculating the class probability mean.

Example 15. The method of any of examples 1-14, wherein predicting the one or more next step sentences is performed via max pooling such that the highest value of the ensemble class scores determines the predicted class.

Example 16. The method of any of examples 1-15, wherein The method of claim 1, wherein predicting the one or more next step sentences comprises applying a threshold for positive class predictions to control for false positive predictions.

Example 17. The method of any of examples 1-16, further comprising: after the one or more next step sentences are predicted, receiving additional labeled training data based on the set of annotation guidelines; and retraining the model based on the additional labeled training data.

Example 18. The method of any of examples 1-17, wherein predicting the one or more next step sentences is performed via max pooling such that the highest value of the ensemble class scores determines the predicted class, wherein the predicted class is positive or negative, and wherein: a positive predicted class determines that a next step sentence is predicted, and a negative predicted class determines that a next step sentence is not predicted.

Example 19. A communication system comprising one or more processors configured to perform the operations of: defining a set of annotation guidelines for labeling training data; receiving a set of labeled training data based on the set of annotation guidelines, comprising a plurality of sentences from a transcript of a communication session, a subset of the sentences being associated with a positive label; organizing the labeled training data via sampling; training a model from the organized and labeled training data, the training comprising, for each of the sentences: inputting the sentence into a language model and a classification head to output a plurality of class probabilities, and inputting a classification token representing the sentence into a classification head; using a plurality of classifiers from the trained model to generate a plurality of ensemble class scores; and using the ensemble class scores to predict one or more next step sentences from the plurality of sentences from the transcript.

Example 20. The communication system of claim 19, wherein the sampling performed to organize the labeled training data is random stratified sampling.

Example 21. The communication system of any of examples 19-20, wherein the one or more processors are further configured to perform the operation of: connecting to a communication session involving one or more participants, the detection of the one or more next step sentences being performed in real time during the communication session.

Example 22. The communication system of any of examples 19-21, wherein the one or more processors are further configured to perform the operations of: receiving the transcript of a conversation between the participants produced during the communication session; and extracting, from the transcript, the plurality of sentences comprising a plurality of utterances spoken by participants during the communication session.

Example 23. The communication system of any of examples 19-22, wherein the one or more processors are further configured to perform the operation of: receiving video output frames for the communication session, the video output frames being used to detect one or more next step sentences from the plurality of sentences from the transcript.

Example 24. The communication system of any of examples 19-23, wherein the plurality of class probabilities comprises one class probability output per sentence.

Example 25. The communication system of any of examples 19-24, wherein the one or more processors are further configured to perform the operation of: computing a cross-entropy loss using the classification token input into the classification head.

Example 26. The communication system of any of examples 19-25, wherein the predicted next step sentences each comprise an owner-action pair structure where the action is an actionable verb in future tense or present tense.

Example 27. The communication system of any of examples 19-26, wherein the one or more processors are further configured to perform the operation of: inferring, from the positive labels associated with the subset of sentences, negative labels to be associated with the remaining sentences outside of the subset of sentences, the model being additionally trained to sample balanced sentences from the negative labels.

Example 28. The communication system of any of examples 19-27, wherein the model is trained via cross-validation.

Example 29. The communication system of example 28, wherein the model is trained via k-fold cross-validation incorporating a plurality of folds.

Example 30. The communication system of example 29, wherein the k-fold cross-validation is stratified.

Example 31. The communication system of any of examples 19-30, wherein the plurality of classifiers are aggregated to generate the plurality of ensemble class scores.

Example 32. The communication system of any of examples 19-31, wherein predicting the one or more next step sentences is performed by calculating the class probability mean.

Example 33. The communication system of any of examples 19-32, wherein predicting the one or more next step sentences is performed via max pooling such that the highest value of the ensemble class scores determines the predicted class.

Example 34. The communication system of any of examples 19-33, wherein predicting the one or more next step sentences comprises applying a threshold for positive class predictions to control for false positive predictions.

Example 35. The communication system of any of examples 19-34, wherein the one or more processors are further configured to perform the operations of: after the one or more next step sentences are predicted, receiving additional labeled training data based on the set of annotation guidelines; and retraining the model based on the additional labeled training data.

Example 36. The communication system of any of examples 19-35, wherein predicting the one or more next step sentences is performed via max pooling such that the highest value of the ensemble class scores determines the predicted class, wherein the predicted class is positive or negative, and wherein: a positive predicted class determines that a next step sentence is predicted, and a negative predicted class determines that a next step sentence is not predicted.

Example 37. A non-transitory computer-readable medium containing instructions for generating a note with session content from a communication session, comprising: instructions for defining a set of annotation guidelines for labeling training data; instructions for receiving a set of labeled training data based on the set of annotation guidelines, comprising a plurality of sentences from a transcript of a communication session, a subset of the sentences being associated with a positive label; instructions for organizing the labeled training data via sampling; instructions for training a model from the organized and labeled training data, the training comprising, for each of the sentences: inputting the sentence into a language model and a classification head to output a plurality of class probabilities, and inputting a classification token representing the sentence into a classification head; instructions for using a plurality of classifiers from the trained model to generate a plurality of ensemble class scores; and instructions for using the ensemble class scores to predict one or more next step sentences from the plurality of sentences from the transcript.

Example 38. The non-transitory computer-readable medium of example 37, wherein the sampling performed to organize the labeled training data is random stratified sampling.

Example 39. The non-transitory computer-readable medium of any of examples 37-38, further comprising: connecting to a communication session involving one or more participants, the detection of the one or more next step sentences being performed in real time during the communication session.

Example 40. The non-transitory computer-readable medium of any of examples 37-39, further comprising: receiving the transcript of a conversation between the participants produced during the communication session; and extracting, from the transcript, the plurality of sentences comprising a plurality of utterances spoken by participants during the communication session.

Example 41. The non-transitory computer-readable medium of any of examples 37-40, further comprising: receiving video output frames for the communication session, the video output frames being used to detect one or more next step sentences from the plurality of sentences from the transcript.

Example 42. The non-transitory computer-readable medium of any of examples 37-41, wherein the plurality of class probabilities comprises one class probability output per sentence.

Example 43. The non-transitory computer-readable medium of any of examples 37-42, further comprising: computing a cross-entropy loss using the classification token input into the classification head.

Example 44. The non-transitory computer-readable medium of any of examples 37-43, wherein the predicted next step sentences each comprise an owner-action pair structure where the action is an actionable verb in future tense or present tense.

Example 45. The non-transitory computer-readable medium of any of examples 37-44, further comprising:

inferring, from the positive labels associated with the subset of sentences, negative labels to be associated with the remaining sentences outside of the subset of sentences, the model being additionally trained to sample balanced sentences from the negative labels.

Example 46. The non-transitory computer-readable medium of any of examples 37-45, wherein the model is trained via cross-validation.

Example 47. The non-transitory computer-readable medium of example 46, wherein the model is trained via k-fold cross-validation incorporating a plurality of folds.

Example 48. The non-transitory computer-readable medium of example 47, wherein the k-fold cross-validation is stratified.

Example 49. The non-transitory computer-readable medium of any of examples 37-48, wherein the plurality of classifiers are aggregated to generate the plurality of ensemble class scores.

Example 50. The non-transitory computer-readable medium of any of examples 37-49, wherein predicting the one or more next step sentences is performed by calculating the class probability mean.

Example 51. The non-transitory computer-readable medium of any of examples 37-50, wherein predicting the one or more next step sentences is performed via max pooling such that the highest value of the ensemble class scores determines the predicted class.

Example 52. The non-transitory computer-readable medium of any of examples 37-51, wherein The non-transitory computer-readable medium of claim 1, wherein predicting the one or more next step sentences comprises applying a threshold for positive class predictions to control for false positive predictions.

Example 53. The non-transitory computer-readable medium of any of examples 37-52, further comprising: after the one or more next step sentences are predicted, receiving additional labeled training data based on the set of annotation guidelines; and retraining the model based on the additional labeled training data.

Example 54. The non-transitory computer-readable medium of any of examples 37-53, wherein predicting the one or more next step sentences is performed via max pooling such that the highest value of the ensemble class scores determines the predicted class, wherein the predicted class is positive or negative, and wherein: a positive predicted class determines that a next step sentence is predicted, and a negative predicted class determines that a next step sentence is not predicted.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
defining a set of annotation guidelines for labeling a sentence within training data as a next step sentence based on parts of speech within the sentence;
receiving a set of labeled training data based on the set of annotation guidelines, comprising a plurality of sentences from a transcript of a communication session, a subset of the sentences being associated with a positive label;
organizing the set of labeled training data via sampling;

training, after organizing the set of labeled training data, a model from the set of labeled training data, the training comprising, for each of the sentences:
  inputting the sentence into a language model and a classification head to output a plurality of class probabilities, and
  inputting a classification token representing the sentence into a classification head;
generating, using a plurality of classifiers from the trained model, a plurality of ensemble class scores;
predicting, using the ensemble class scores, one or more next step sentences from the plurality of sentences from the transcript, wherein the one or more next step sentences correspond to an action item performed by a speaker of the one or more next step sentences after the communication session;
determining a total number of next step sentences predicted for the communication session and a number of next step sentences predicted for a participant of the communication session;
determining that the total number of next step sentences falls within a recommended range of next step sentences, wherein the recommended range is based on participants of the communication session; and
displaying, via a user interface, a visual comparison between the total number of next step sentences and the number of next step sentences predicted for the participant.

2. The method of claim 1, wherein the sampling performed to organize the set of labeled training data is random stratified sampling.

3. The method of claim 1, further comprising:
segmenting the communication session into a plurality of topic segments; and
associating each of the one or more next step sentences with a topic segment of the plurality of topic segments.

4. The method of claim 1, further comprising:
receiving the transcript of a conversation between participants produced during the communication session; and
extracting, from the transcript, the plurality of sentences comprising a plurality of utterances spoken by participants during the communication session.

5. The method of claim 1, further comprising:
receiving video output frames for the communication session, the video output frames being used to detect one or more next step sentences from the plurality of sentences from the transcript.

6. The method of claim 1, wherein the plurality of class probabilities comprises one class probability output per sentence.

7. The method of claim 1, further comprising:
computing a cross-entropy loss using the classification token input into the classification head.

8. The method of claim 1, wherein the one or more next step sentences each comprise an owner-action pair structure where the action is an actionable verb in future tense or present tense.

9. The method of claim 1, further comprising:
inferring, from the positive labels associated with the subset of sentences, negative labels to be associated with remaining sentences outside of the subset of sentences, the model being additionally trained to sample balanced sentences from the negative labels.

10. The method of claim 1, wherein the model is trained via cross-validation.

11. The method of claim 10, wherein the model is trained via k-fold cross-validation incorporating a plurality of folds.

12. The method of claim 11, wherein the k-fold cross-validation is stratified.

13. The method of claim 1, wherein the plurality of classifiers are aggregated to generate the plurality of ensemble class scores.

14. The method of claim 1, wherein predicting the one or more next step sentences is performed by calculating a class probability mean.

15. The method of claim 1, wherein predicting the one or more next step sentences is performed via max pooling such that a highest value of the ensemble class scores determines a predicted class.

16. The method of claim 1, wherein predicting the one or more next step sentences comprises applying a threshold for positive class predictions to control for false positive predictions.

17. The method of claim 1, further comprising:
after the one or more next step sentences are predicted, receiving additional labeled training data based on the set of annotation guidelines; and
retraining the model based on the additional labeled training data.

18. A communication system comprising one or more processors configured to perform operations comprising:
defining a set of annotation guidelines for labeling a sentence within training data as a next step sentence based on parts of speech within the sentence;
receiving a set of labeled training data based on the set of annotation guidelines, comprising a plurality of sentences from a transcript of a communication session, a subset of the sentences being associated with a positive label;
organizing the set of labeled training data via sampling;
training, after organizing the set of labeled training data, a model from the set of labeled training data, the training comprising, for each of the sentences:
  inputting the sentence into a language model and a classification head to output a plurality of class probabilities, and
  inputting a classification token representing the sentence into a classification head;
generating, using a plurality of classifiers from the trained model, a plurality of ensemble class scores;
predicting, using the ensemble class scores, one or more next step sentences from the plurality of sentences from the transcript, wherein the one or more next step sentences correspond to an action item performed by a speaker of the one or more next step sentences after the communication session;
determining a total number of next step sentences predicted for the communication session and a number of next step sentences predicted for a participant of the communication session;
determining that the total number of next step sentences falls within a recommended range of next step sentences, wherein the recommended range is based on participants of the communication session; and
displaying, via a user interface, a visual comparison between the total number of next step sentences and the number of next step sentences predicted for the participant.

19. The communication system of claim 18, wherein predicting the one or more next step sentences is performed via max pooling such that a highest value of the ensemble class scores determines the predicted class.

wherein the predicted class is positive or negative, and wherein:
 a positive predicted class determines that a next step sentence is predicted, and
 a negative predicted class determines that a next step sentence is not predicted.

20. A non-transitory computer-readable medium containing instructions for generating a note with session content from a communication session, comprising:
 instructions for defining a set of annotation guidelines for labeling a sentence within training data as a next step sentence based on parts of speech within the sentence;
 instructions for receiving a set of labeled training data based on the set of annotation guidelines, comprising a plurality of sentences from a transcript of a communication session, a subset of the sentences being associated with a positive label;
 instructions for organizing the set of labeled training data via sampling;
 instructions for training, after organizing the set of labeled training, a model from the set of labeled training data, the training comprising, for each of the sentences:
  inputting the sentence into a language model and a classification head to output a plurality of class probabilities, and
  inputting a classification token representing the sentence into a classification head;
 instructions for generating, using a plurality of classifiers from the trained model, a plurality of ensemble class scores;
 instructions for predicting, using the ensemble class scores, one or more next step sentences from the plurality of sentences from the transcript, wherein the one or more next step sentences correspond to an action item performed by a speaker of the one or more next step sentences after the communication session;
 instructions for determining a total number of next step sentences predicted for the communication session and a number of next step sentences predicted for a participant of the communication session;
 instructions for determining that the total number of next step sentences falls within a recommended range of next step sentences, wherein the recommended range is based on participants of the communication session; and
 instructions for displaying, via a user interface, a visual comparison between the total number of next step sentences and the number of next step sentences predicted for the participant.

* * * * *